Nov. 21, 1933.  E. H. HANSEN ET AL  1,936,301
VALVE
Filed Nov. 16, 1932
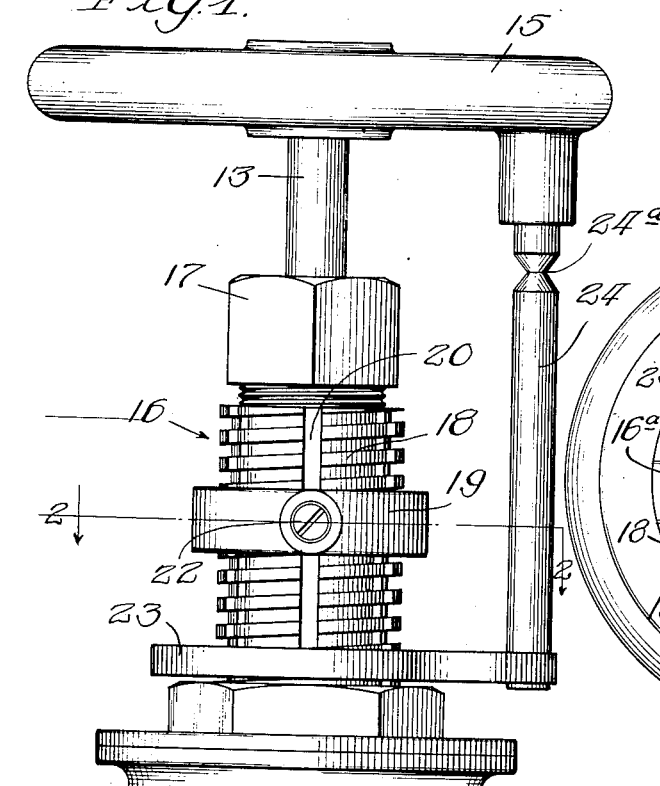
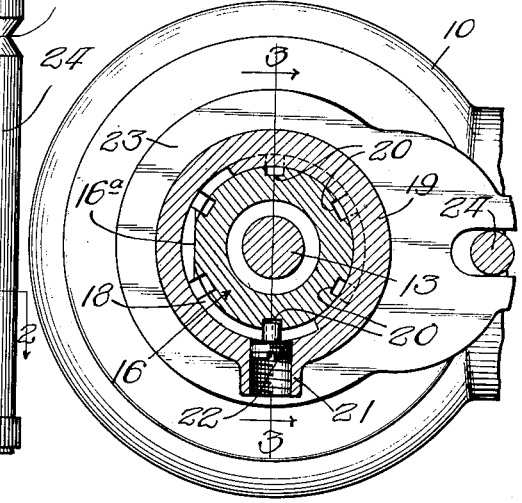
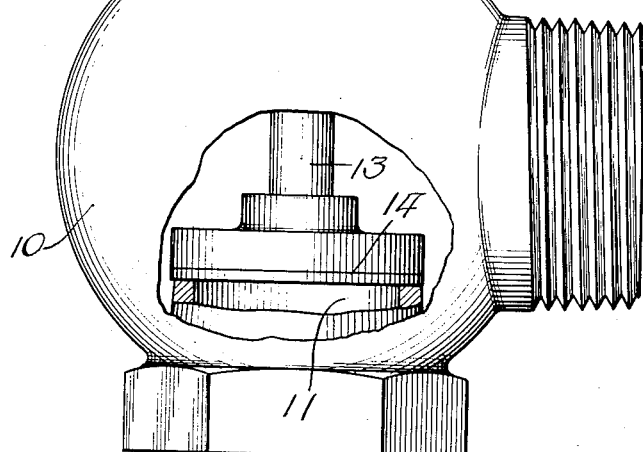
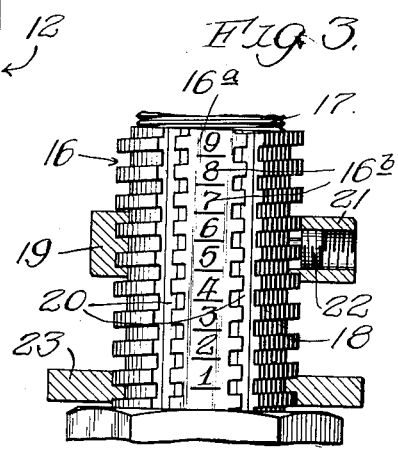
Inventors:
Edward H. Hansen,
Elwood E. Hansen,
By Dynaforth, Lee, Chritton & Wiles,
Attys.

UNITED STATES PATENT OFFICE 1,936,301

VALVE

Edward H. Hansen and Elwood E. Hansen, Elkhart, Ind., assignors to Elkhart Brass Mfg. Co., Elkhart, Ind., a corporation of Indiana Application November 16, 1932
Serial No. 642,954

5 Claims. (Cl. 251—152)

This invention relates to improvements in valves and, more especially, a valve with an adjustable stop means limiting the maximum opening of the valve.

Among the features of our invention is the provision of such adjustable stop means that is simple and efficient in construction and operation.

Another feature of our invention is the provision in combination with the adjustable stop means of breakable means rendering said stop means inoperative.

The invention is particularly applicable for use in connection with valves on fire protection standpipes in buildings. In this connection, it is frequently necessary or desirable to adjust the valve on each floor to a certain opening so that the pressure delivered on that floor will not exceed the desired amount. By the use of our invention, valves may be installed on such a standpipe and each one adjusted to deliver the desired pressure.

Other features and advantages of our invention will appear more fully as we proceed with our specification.

In that form of device embodying the features of our invention shown in the accompanying drawing—

Figure 1 is a view in side elevation with a portion broken away; Fig. 2 is a view taken as indicated by the line 2 of Fig. 1; and Fig. 3 is a view taken as indicated by the line 3 of Fig. 2.

As shown in the drawing, the valve includes a fluid chamber 10 with an inlet opening 11 and an outlet 12.

The valve is provided with the usual rotatable stem 13 attached to a closure member inside of the valve, for example, the usual disc, gate, or the like. As here shown, the closure member is the disc 14 which seats upon a suitable seat. 15 indicates the usual handle attached to the stem 13. 16 indicates the substantially cylindrical stem support attached to the fluid chamber 10 which carries the usual packing nut 17 at its upper end.

As here shown, the stem support 16 is provided with external threads 18 on which is mounted an adjustable collar 19. The stem support 16 is also provided with vertical grooves 20 which interrupt the threads 18. The collar 19 is provided with an internally threaded boss 21 in which is mounted the set screw 22. The inner end of this set screw is reduced in diameter so that when the same is screwed in, it will engage one of the slots 20. There are six of these slots provided so that by means of the set screw 22, the collar 19 may be adjusted in various positions on the stem support 16. When thus adjusted, the set screw 22 locks the same against rotation.

23 indicates a second collar threaded on the threads 18 on the stem support 16. It is to be understood that the pitch of the threads 18 is the same as the pitch of the threads inside of the valve controlling the movement of the stem 13. The collar 23 is connected to the handle 15 by the vertical bar 24 which is provided with a weakened portion 24ᵃ to make the same breakable under strain.

In the operation of the valve, the collar 19 is adjusted at the desired height. When the valve is opened by screwing up the handle 15, the collar 23 is screwed up with it until it engages the adjustable stop means which is the collar 19. The maximum opening of the valve is thus limited. Additional strain on the handle 15, however, will serve to break the bar 24 at the point 24ᵃ so that the handle 15 may be further operated to open the valve to its fullest extent. The portion 24ᵃ of the bar 24 may be weakened so that it will break with any additional or excessive strain desired.

The stem support 16 may be provided with a flattened portion 16ᵃ containing calibrations 16ᵇ to show the position at which the valve is adjusted.

While we have shown and described certain embodiments of our invention, it is to be understood that it is capable of many modifications. Changes, therefore, in the construction and arrangement may be made without departing from the spirit and scope of the invention as disclosed in the appended claims, in which it is our intention to claim all novelty inherent in our invention as broadly as permissible, in view of the prior art.

What we regard as new, and desire to secure by Letters Patent, is:

1. A valve, including; a fluid chamber with an inlet and outlet; a closure member in the fluid chamber; a rotatable and longitudinally movable stem attached to the closure member; a handle attached to the stem; a substantially cylindrical stem support attached to the fluid chamber; an adjustable collar on the stem support; a second collar on the stem support between the first-mentioned collar and the fluid chamber and movable longitudinally of said support; and a connection between and fastened to the second-mentioned collar and the handle.

2. A valve, including; a fluid chamber with an inlet and outlet; a closure member in the fluid chamber; a rotatable and longitudinally movable stem attached to the closure member; a handle attached to the stem; a substantially cylindrical stem support attached to the fluid chamber; an adjustable collar on the stem support; a second collar on the stem support between the first-mentioned collar and the fluid chamber and movable longitudinally of said support; and a readily breakable connection between and fastened to the second-mentioned collar and the handle.

3. A valve as claimed in claim 1, in which the adjustable collar is threaded on the stem support.

4. A valve as claimed in claim 1, in which the second-mentioned collar is threaded on the stem support.

5. A valve as claimed in claim 1, in which both collars are threaded on the stem support.

EDWARD H. HANSEN.
ELWOOD E. HANSEN.